US009189166B2

United States Patent
Kanigicherla et al.

(10) Patent No.: US 9,189,166 B2
(45) Date of Patent: Nov. 17, 2015

(54) MULTI-HOST SATA CONTROLLER

(75) Inventors: Balaji Kanigicherla, Hyderabad (IN); Krishna Mohan Tandaboina, Hyderabad (IN); Siva Raghuram Voleti, Hyderabad (IN); Karamveer Yadav, Hyderabad (IN)

(73) Assignee: INEDA SYSTEMS PVT. LTD., Hyderabad (IN)

( * ) Notice: Subject to any disclaimer, the term of this patent is extended or adjusted under 35 U.S.C. 154(b) by 288 days.

(21) Appl. No.: 14/111,379

(22) PCT Filed: Apr. 9, 2012

(86) PCT No.: PCT/IN2012/000254
§ 371 (c)(1),
(2), (4) Date: Oct. 11, 2013

(87) PCT Pub. No.: WO2012/140670
PCT Pub. Date: Oct. 18, 2012

(65) Prior Publication Data
US 2014/0032948 A1 Jan. 30, 2014

(30) Foreign Application Priority Data
Apr. 11, 2011 (IN) .......................... 1261/CHE/2011

(51) Int. Cl.
*G06F 3/06* (2006.01)
*G06F 13/12* (2006.01)

(52) U.S. Cl.
CPC .............. *G06F 3/0632* (2013.01); *G06F 3/067* (2013.01); *G06F 3/0625* (2013.01); *G06F 13/126* (2013.01)

(58) Field of Classification Search
CPC ... G06F 1/3268; G06F 3/0632; G06F 3/0625; G06F 3/0629; G06F 3/067; G06F 13/126; G06F 13/14
See application file for complete search history.

(56) References Cited

U.S. PATENT DOCUMENTS

| 7,689,744 | B1 | 3/2010 | McCarty et al. |
| 2005/0169356 | A1* | 8/2005 | Matsumoto ........... G06F 1/3203 375/220 |
| 2007/0237174 | A1* | 10/2007 | Chang ................. G06F 13/4027 370/467 |
| 2009/0177815 | A1 | 7/2009 | Nemazie et al. |
| 2010/0146166 | A1* | 6/2010 | Gadsing ............... G06F 3/0607 710/100 |

FOREIGN PATENT DOCUMENTS

| CN | 1797377 | 7/2006 |
| CN | 101833989 | 9/2010 |

* cited by examiner

*Primary Examiner* — Dennis M Butler

(57) ABSTRACT

Described herein is a system having a multi-host SATA controller (102) configured to provide communication and control between two or more independent host processors (104) and a single SATA device (108). In one implementation, the multi-host SATA controller (102) includes the device switching layer (206), the device control layer (208), the link layer (210), and the physical layer (212). The device switching layer (206) allows the host processors (104) to issue commands concurrently rather than in sequential order. For this, the device switching layer (206) has independent set of host device registers (214) corresponding to each of the host processors (104). The device switching layer (206) also has independent DMA engines (216) to perform a command prefetching from respective host system memories (105). Further, a command switch engine (220) may arbitrate commands in case both the host processors (104) wish to access the SATA device (108) simultaneously.

20 Claims, 5 Drawing Sheets

MULTI-HOST SATA CONTROLLER

TECHNICAL FIELD

The present subject matter relates, in general, to a computing system having multi-host processors and, in particular, to a serial ATA (SATA) controller for the multi-host processors.

BACKGROUND

Processing speeds of central processing units (CPUs) of computer systems have increased many fold in the recent past, and the introduction of high speed buses, such as peripheral component interface (PCI)-express, has caused performance of the computer systems to grow rapidly. However, for connecting host bus adapters to mass storage devices, such as hard disk drives and optical drives, the maximum speed of a parallel advanced technology attachment (PATA) standard is limited to 133 MB/s. Hence, a serial advanced technology attachment (SATA) standard was proposed. The serial link employed is a point-to-point high-speed differential link that utilizes gigabit technology. A SATA based mass storage device, also referred to as SATA device, provides a high bandwidth, low cost, and low power mass storage solution as compared to PATA.

Conventionally, a host processor (also referred to as host herein) communicates with the SATA device through a SATA host controller. The SATA controller receives commands from the host and sends the commands over a serial link to the SATA device. In a similar manner, the SATA controller also receives the command response and data from the SATA device over the same serial link and sends such data to the host processor. Such SATA host controllers are generally configured to communicate with a single host processor as SATA protocol architecture supports single host processor and SATA device configuration.

More recently, multiple operating systems on single host or multiple host systems are being developed. When multiple operating systems are developed, a virtualization intermediary (VI), such as virtual machine monitor (VMM) or Hypervisor, is also implemented to enable the multiple different operating systems. The VMM enables sharing of the peripherals generally connected to an I/O controller. However, such software based virtualization solutions cause high latencies and thus sharing of a SATA device with the software solution can become a bottleneck in the overall system performance.

In another example, the multiple hosts are connected to a single SATA device using external Serial Attached SCSI (SAS) expanders, which usually tunnel the SATA protocol. These expanders act as external switches and still provide access to the host one at a time. In this case, the two hosts need to coordinate to decide who accesses the SATA device, which is difficult and may not be possible in cases where the two given hosts are on different sub-systems and do not communicate with each other.

SUMMARY

This summary is provided to introduce concepts related to a SATA controller for a multi-host system, which are further described in the detailed description. This summary is not intended to identify essential features of the present subject matter nor is it intended for use in determining or limiting the scope of the present subject matter.

In one implementation, the multi-host SATA controller includes four layers, namely, the device switching layer, the device control layer, the link layer, and the physical layer. The device switching layer includes an independent set of registers corresponding to each of the host processors. The device switching layer also has independent direct memory access (DMA) engines to perform a command pre-fetching from respective host system memories. The pre-fetched commands are stored in the respective host command buffers to be issued to the SATA device. The selection of the host processor is done through a command switch engine, which is configured to gracefully switch from one host to another in case both the hosts request for concurrent access to the SATA device.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
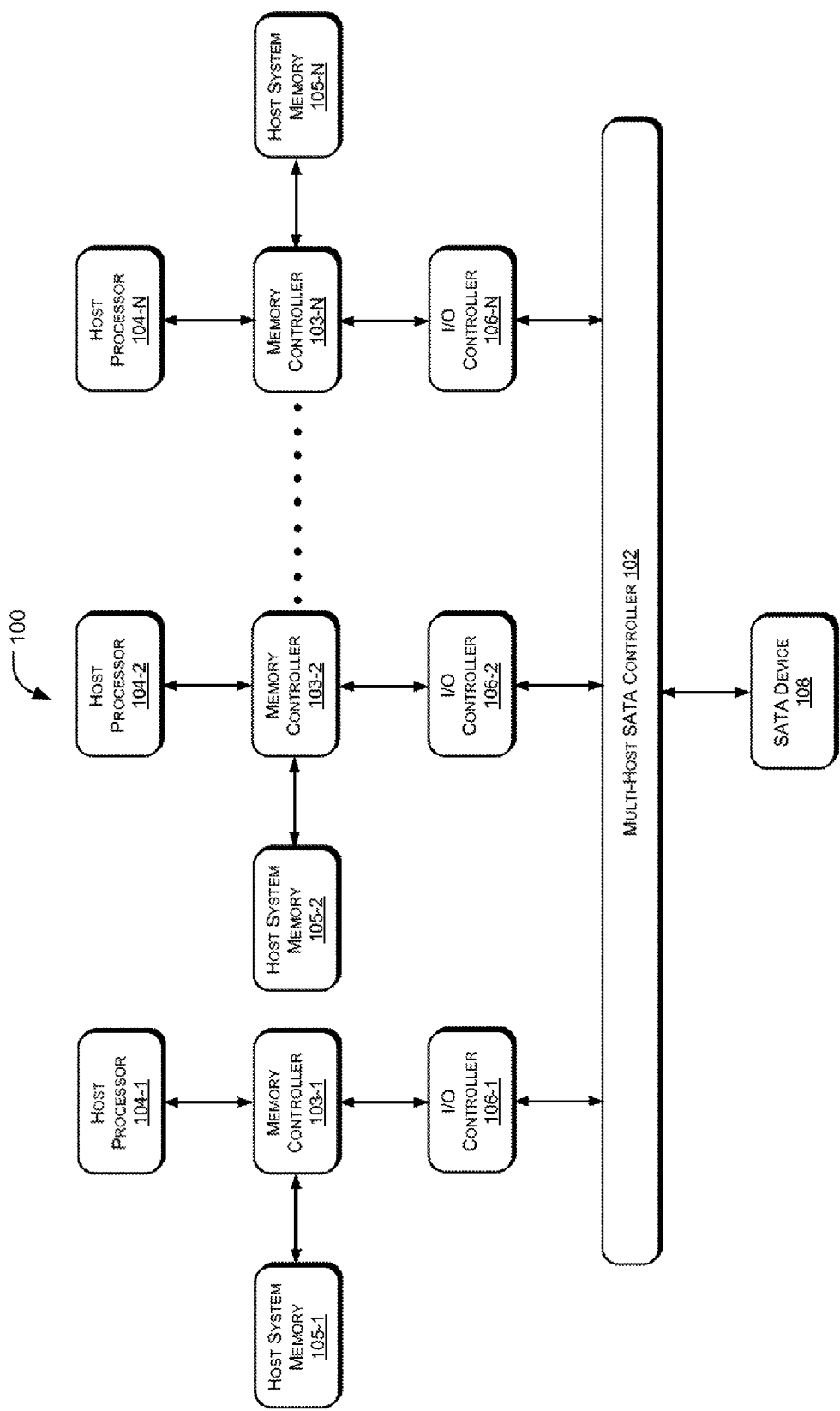
FIG. 1 illustrates a multi-host computing system implementing a multi-host SATA controller, according to an embodiment of the present subject matter.

The present subject matter relates, in general, to a computing system having multi-host processors and, in particular, to a serial ATA (SATA) controller for the multi-host processors. SATA is a high speed serial link that has replaced parallel ATA for peripherals, such as mass storage devices. Typically, the single host systems include a SATA controller, which facilitates communication between the host and the SATA device. However, for multi-host systems, the options available for accessing the SATA device are either cost intensive or have degraded system performance. For example, the multiple host systems may have dedicated peripherals for each of the host systems; however, such a scheme is cost intensive. In another example, the host systems are connected to a shared peripheral pool and each of the host systems access the peripherals on a sequential basis. For this, SATA expanders or switches are implemented in between the hosts and the SATA devices. The SATA switch has multiple SATA ports on the host side and a singular SATA port on the device side. However, such schemes do not provide concurrent access to hosts. Moreover, the expanders or external switches are meant for physically separate systems having a common access to the SATA device.

The embodiments provided herein describe an exemplary multi-host SATA controller, which can provide communication and control between two or more independent host processors and a single SATA device. Either of the hosts can simultaneously issue commands to the SATA device without wasting long time periods in waiting. Also, the SATA device is not switched from one host to another, thereby reducing switching time between the hosts.

In one implementation, the multi-host SATA controller includes four layers, namely, a device switching layer, a device control layer, a link layer, and a physical layer. In one embodiment, the device switching layer is configured to communicate with software of the hosts for command and status updates. The device switching layer allows both the hosts to issue commands concurrently rather than in sequential order. For this, the device switching layer has independent set of host device registers corresponding to each of the host processors. The host device registers include both Advanced Host Controller Interface (AHCI) compliant status registers and control registers; Peripheral Component Interconnect (PCI) Configuration registers, etc., configured for sharing of the SATA device. The device switching layer also has independent direct memory access (DMA) engines to perform a command pre-fetching from respective host system memories. The pre-fetched commands, which are to be issued to the SATA device, are stored in the respective host command buffers. The selection of the host processor is done through a command switch engine, which arbitrates in case both the hosts wish to access the SATA device simultaneously. Additionally, the device switching layer can control load balance from each of the hosts to the SATA device. The commands from each of the hosts may be interleaved and priority tables may be implemented for such interleaving. The multi-host SATA controller described herein is also capable of power management control, interrupt handling, and generating asynchronous notifications.

Devices that can implement the disclosed system(s) and method(s) include, but are not limited to, desktop computers, hand-held devices, multiprocessor systems, microprocessor based programmable consumer electronics, laptops, network computers, minicomputers, mainframe computers, and the like which utilize multiple processors on the same hardware platform. In one implementation, the method can also be implemented for systems running any operating system such as Linux, Unix, Microsoft® Windows®, Mac OS X®, Android, and the like. Although the description herein is with reference to certain multi-host computing systems running particular operating systems, the systems and methods may be implemented in other operating systems and computing systems, albeit with a few variations, as will be understood by a person skilled in the art.

Multiple operating systems are typically used to perform different functions on the same hardware platform. Each operating system may provide a particular advantage over different operating system (OS). For example, in a multi-host computing system which may run two different operating systems, OS 1 and OS 2, the OS 1 may provide better performance or support more applications than OS 2 however, the OS 2 may consume less resources such as memory, processing power, battery power when compared to OS 1. In such a scenario, the computing system may implement OS 1 for application processing and computational purposes whereas may implement OS 2 during idle state.

FIG. 1 illustrates a multi-host computing system 100 implementing a multi-host SATA controller 102, according to an embodiment of the present subject matter. In said embodiment, the multi-host computing system 100, also referred to as system 100 hereinafter, includes host processors 104-1, 104-2, . . . , 104-N, collectively referred to as host processors 104. The host processors 104 may include microprocessors, microcomputers, microcontrollers, digital signal processors, central processing units, state machines, logic circuitries, and/or any devices that manipulate signals and data based on operational instructions. Further, the system 100 includes memory controllers 103-1, 103-2, . . . , 103-N, which are associated with host system memory 105-1, 105-2, . . . , 105-N, respectively.

Each of the host processors 104 is associated with an I/O controller. For example, the host processor 104-1 is associated with I/O controller 106-1, the host processor 104-2 is associated with I/O controller 106-2, and the host processor 104-N is associated with I/O controller 106-N. The I/O controllers 106-1, 106-2, . . . , 106-N collectively referred to as I/O controller(s) 106, are connected to the multi-host SATA controller 102. In one implementation, the multi-host SATA controller 102 is configured to allow two or more hosts to concurrently access at least one SATA device 108. Examples of the SATA device 108 include hard disks drives, optical drives, etc.

Even though the illustration shows the multi-host SATA controller 102 and I/O controller 106 as separate entities; however a single I/O controller 106 may be connected between the host processors 104 and the SATA device 108. Additionally, the multi-host SATA controller 102 may be integrated into the I/O controller 106.

In operation, each of the host processors 104 communicates with the SATA device 108 using an independent set of configuration registers (not shown in this figure). More specifically, each of the host processors 104 independently interacts with the multi-host SATA controller 102 using separate direct memory access (DMA) channels, command pre-fetching, queuing, and transferring commands/data to the SATA device 108. In one embodiment, the multi-host SATA controller 102 also seamlessly switches control of the SATA device 108 from one host processor; say the host processor 104-1, to another host processor, e.g., the host processor 104-2 in a pre-defined time frame so as to provide seamless user experience. This is further explained with reference to the subsequent figures.

Figure 2:
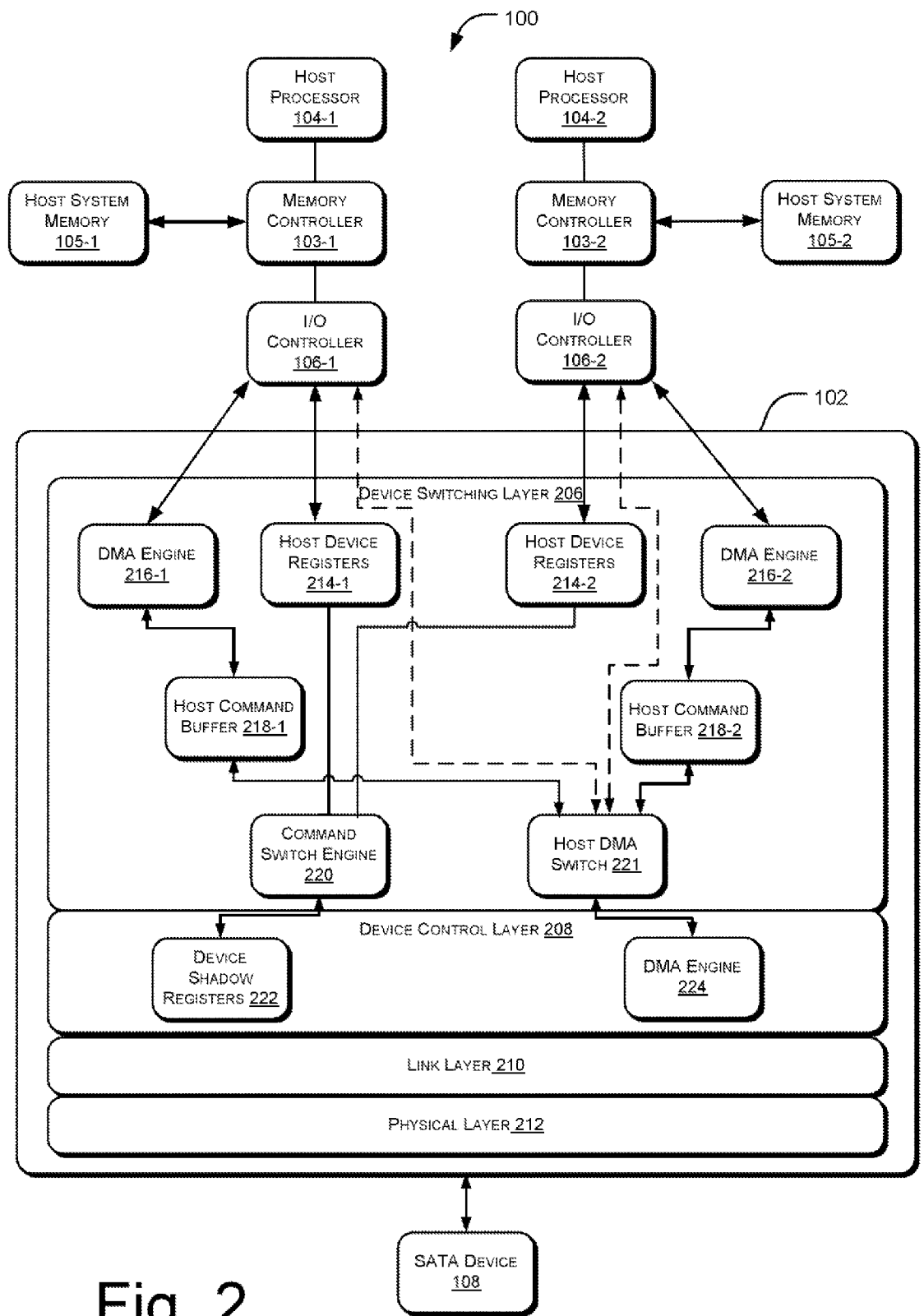
FIG. 2 illustrates architecture of the exemplary multi-host SATA controller within the system, in accordance with an embodiment of the present subject matter.

FIG. 2 illustrates architecture of the exemplary multi-host SATA controller 102 within the system 100, in accordance with an embodiment of the present subject matter. As mentioned before, the system 100 includes host processors 104 and memory controllers 103-1 and 103-2. The memory controllers 103-1 and 103-2 are associated with host system memory 105-1 and host system memory 105-2, respectively. As an illustration, only two host processors are shown to interact with the SATA device 108; however multiple host processors may be present as will be understood by a person skilled in the art. The system 100 also includes I/O controllers 106 connected to the multi-host SATA controller 102, which is further connected to the SATA device 108.

In said embodiment, the multi-host SATA controller 102 is defined to have at least four layers of communication, namely, a device switching layer 206, a device control layer 208, a link layer 210, and a physical layer 212. The basic unit of communication or exchange is a frame. A frame comprises a start of frame (SOF) primitive, a frame information structure (FIS), a cyclic redundancy checksum (CRC) calculated over the contents of the FIS and the end of frame (EOF) primitive. The definitions of frames and frame components are provided in the SATA specification released by the SATA organization and may be used as a reference.

The link layer 210 and the physical layer 212 are configured to allow serial transmission of data between the multi-host SATA controller 102 and the SATA device 108. It will be understood that data may include frame primitives based on control signals, etc. In one embodiment, the device switching layer 206 is responsible for the communication with the host software for command and status updates. The device switching layer 206 allows both the hosts to issue commands concurrently rather than in sequential order. For this, the device switching layer 206 has independent set of registers corresponding to each of the host processors 104. For example, the host device registers 214-1 correspond to the host processor 104-1, while host device registers 214-2 correspond to the host processor 104-2. The host device registers 214-1 and 214-2 include Advanced Host Controller Interface (AHCI) compliant control and status registers, PCI Configuration registers, etc., configured for sharing of the SATA device 108. The device switching layer 206 also has independent DMA engines, such as the DMA engine 216-1 and 216-2 to perform a command pre-fetching from host system memories 105-1 and 105-2 respectively. The pre-fetched commands are stored in the respective host command buffers 218-1 and 218-2 to be issued to the SATA device 108. The selection of the host processor 104 is done through a command switch engine 220, which arbitrates in case both the hosts wish to access the SATA device 108 simultaneously. The selected host, then, routes its commands to the device control layer 208 via a host DMA switch 221.

The layer below the device switching layer 206 is the device control layer 208, which is responsible for issuing commands to the SATA device 108. The device control layer 208 maintains a shadow copy of the AHCI register bank, referred to as device shadow registers 222, similar to the one implemented in the device switching layer 206. Thus, the device control layer 208 behaves as a virtual host and communicates with the SATA device 108 similar to a conventional single host system. The device control layer 208 also has a DMA engine 224, which operates based on commands being updated in the device shadow registers 222. The DMA engine 224 in the device control layer 208 works independent of the device switching layer 206 and generates the memory access for getting commands and data based on information available in the device shadow registers 222. This setup for independent operation of the device control layer 208 and the device switching layer 206 ensures that concurrent commands, which are being issued by the host processors 104, do not affect the operation of the lower layers, such as the link layer 210 and the physical layer 212 and does not need any change in driver software. In one implementation, the multi-host SATA controller 102 may be used in a single host environment with complete bypass of the device switching layer 206, thus reducing power consumption.

Furthermore, the SATA device 108 can be configured for advanced power management features, in which the multi-host SATA controller 102 can send the SATA device 108 into a low power mode when no commands are pending. This can pose a serious risk in the multi host environment, where any kind of power management request by an idle host, such as host processor 104-1, can cause the SATA device 108 not to respond to another host, such as host processor 104-2, which has pending commands. Thus, in one implementation, both hardware and software controlled power management configurations are provided. These configurations are selected during platform configuration.

In hardware solution, when any host processor 104 generates command for the SATA device 108 to transition to low power mode, the device switching layer 206 will register the low power request from the host processor 104. However, the same request is not passed on directly to the device control layer 208 and thus the SATA device 108 remains unaffected from the power management command. The device switching layer 206 sets the PxSSTS.IPM (SATA status register, Interface Power Management) bit in the host device register 214-2 to the request low power state. The device switching layer 206 may also send a dummy completion status signal to the host processor 104-2 to indicate a successful transition of the SATA device 108 to a low power state whereas the SATA device 108 may still be connected to other host processors 104, such as the host processor 104-1 in active mode. Thus, the SATA port (not shown in the figure) appears as in low power mode to the requesting host processor 104-2 while the port is active and is serving the other host processor 104-1 commands.

In case, after completion of all the pending commands, the other active host processor 104-1 also request a low power state, the host driver will update its host device registers 214-1 in the device switching layer 206. The device switching layer 206 compares the requested low power state with the one from the previous host processor 104-2 and makes a decision for a common low power state (partial or slumber). As now both the host processors 104 are requesting a low power mode, the device switching layer 206 may consider a valid power management request for the SATA device 108.

The device switching layer 206 may update the low power request to the device control layer 208, which makes the SATA device 108 to go in low power mode. A programmable timer may also be used to control the low power request to the device in order to avoid frequent low power entry.

In case any host processor 104 in low power mode requests the SATA device 108 to transition to an active mode, the complete initialization cycle for the host processor 104 is handled by the device switching layer 206 and no effect occurs on the SATA device 108. Subsequently, the device switching layer 206 updates the SATA device 108 ready status to the host processor 104.

In software solution, the decision to place the SATA device 108 in low power mode is taken by a platform control processor (not shown in the figure). The device switching layer 206 implements system power management registers within the host device registers 214 which can be updated by the platform control processor to request a low power transition. When any host processor 104 requests for a low power transition, the device switching layer 206 generates an interrupt to the platform control processor with the information of the requesting host processor 104. The platform control processor maintains the status for all the host processors 104 requesting low power states and updates the control register within the host device registers 214 for the desired low power state. Rest of the functionality between device switching layer 206 and the device control layer 208 remains same as the hardware method.

The operation of the multi-host SATA controller 102 is further explained in the context of various processes, such as initialization of the SATA device 108, the execution of commands in case of switching between two or more host processors 104, interrupt handling, and power management.

Figure 3:
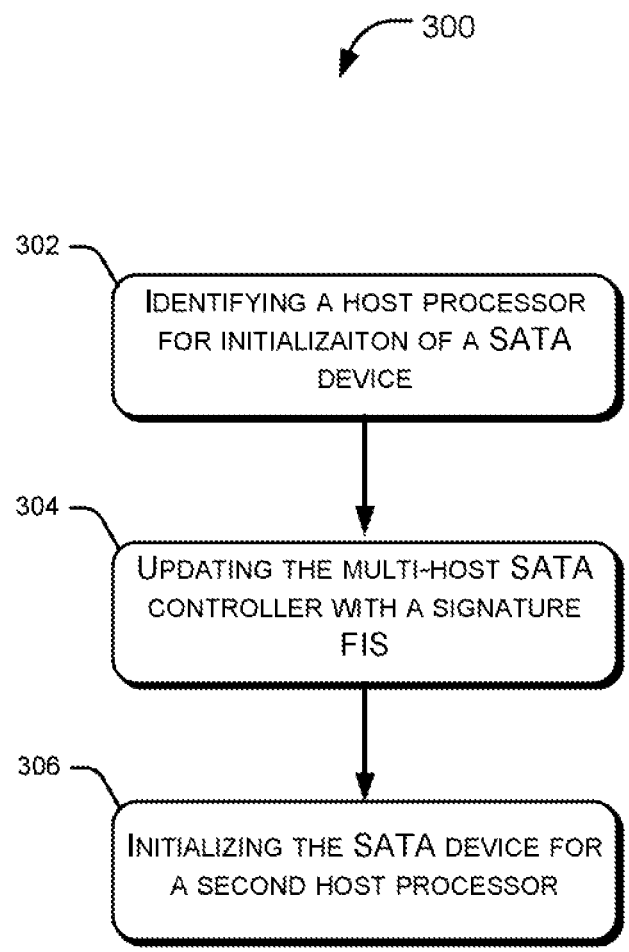
FIGS. 3 and 4 illustrate exemplary methods for initializing the SATA device and executing commands from a plurality of host processors, respectively, according to an embodiment of the present subject matter.
Figure 4:
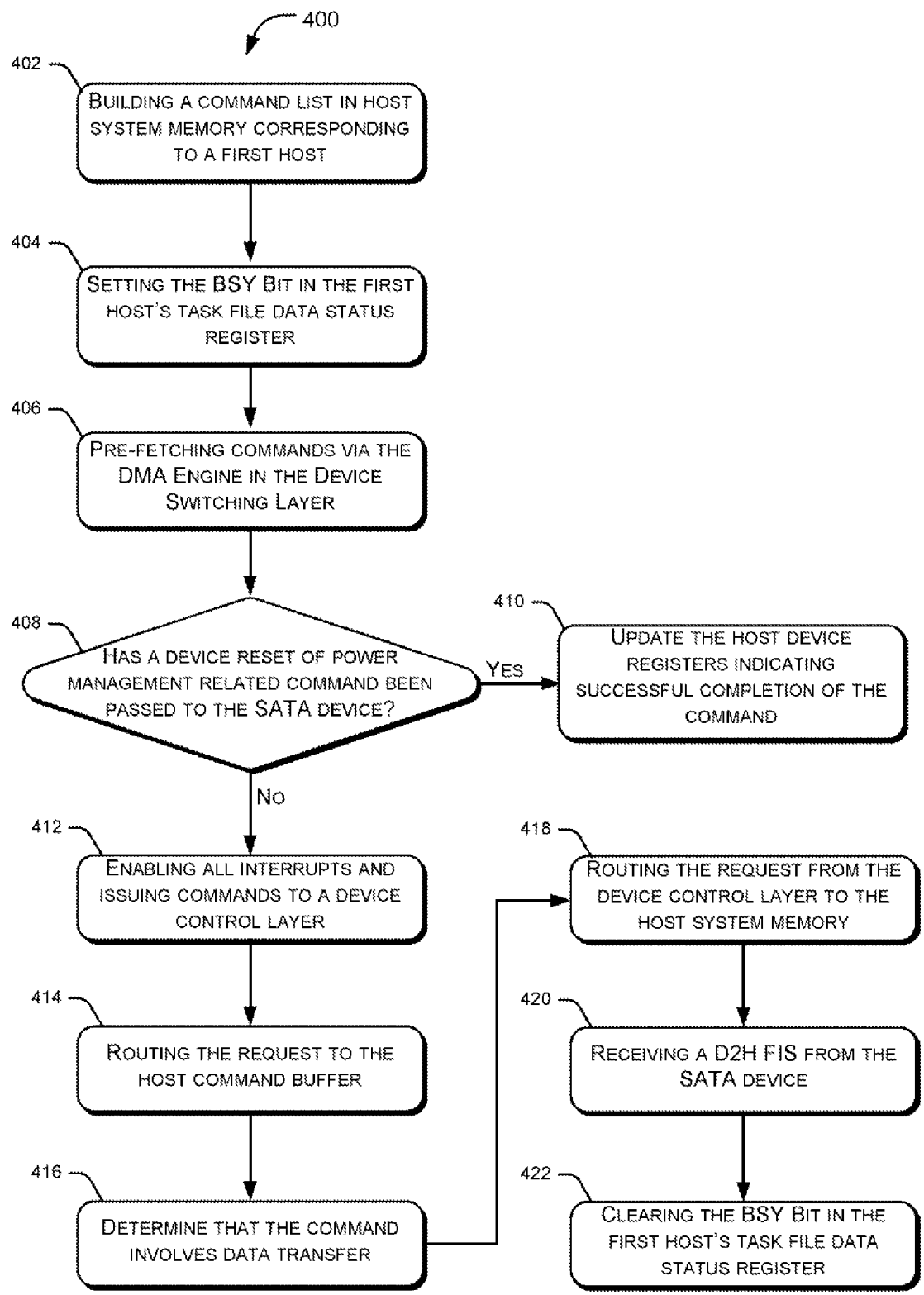
Figure 5:
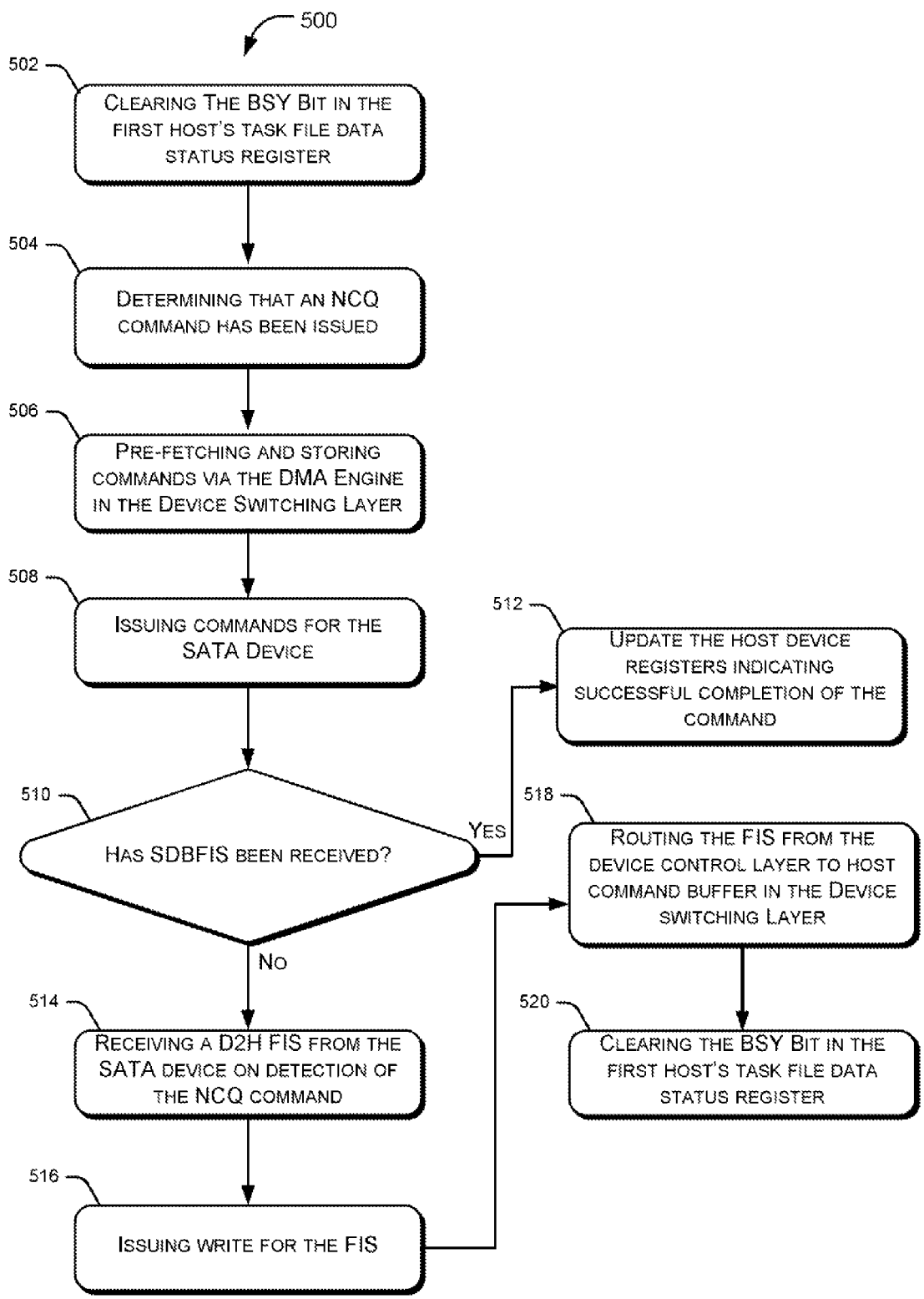
FIG. 5 illustrates the execution of queued commands, according to an embodiment of the present subject matter.

FIGS. 3 and 4 illustrate exemplary methods 300 and 400 for initializing the SATA device 108 and executing commands from a plurality of host processors 104, respectively in accordance with an implementation of the present subject matter. FIG. 5 illustrates the execution of queued commands, according to an implementation of the present subject matter. The exemplary methods may be described in the general context of computer executable instructions embodied on a computer-readable medium. Generally, computer executable instructions can include routines, programs, objects, components, data structures, procedures, modules, functions, etc., that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

The order in which the methods 300, 400 and 500 are described is not intended to be construed as a limitation, and any number of the described method blocks can be combined in any order to implement the methods, or an alternative method. Additionally, individual blocks may be deleted from the methods without departing from the spirit and scope of the method, systems and devices described herein. Furthermore, the methods be implemented in any suitable hardware, software, firmware, or combination thereof.

Additionally, the methods 300, 400 and 500 have been described from the context of the system 100 and the multi-host SATA controller 102; however, other embodiments may also be possible as will be understood by a person skilled in the art.

Referring to FIG. 3, at block 302, a host processor from amongst host processors 104 is identified for initialization of the SATA device 108. In one implementation, after the platform is powered up, platform BIOS software enables either of the host processors 104 to perform the initialization of the SATA device 108. The SATA device 108 initialization includes detection of the SATA device 108, staggered spin-up process, link speed configuration and waiting for the SATA device 108 to be ready. As the SATA device 108 is shared between two host processors 104, the supported link speed is fixed to the lowest common speed at which both the host processors 104 can operate. This is achieved by configuring the Interface Speed Supported (CAP.ISS) register in the device control layer 208 to the lowest common speed as defined by the platform BIOS. This will limit the negotiated speed between the SATA device 108 and the multi-host SATA controller 102. Also any kind of request for higher speed by any host processor 104 is returned as un-supported speed by updating the status registers in the device switching layer 206.

At block 304, the multi-host SATA controller 102 is updated with a signature Frame Information Structure (FIS), which consists of status of the SATA device 108 and also the kind of SATA device 108 (ATA/ATAPI). In order to enable the multi-host SATA controller 102 to update the received FIS in host system memory 105-1 or 105-2, as the case may be, the respective host processor 104 sets the FIS Receive Enable bit and FIS Base Address registers (PxCMD.FRE and PxFB, as defined in AHCI specification ver. 1.3) in the device switching layer 206. As a result, the command switch engine 220 in the device switching layer 206 updates the PxCMD.FRE and PxFB in the device control layer 208, but the PxFB value is modified to address the host command buffer 218-1 in the device switching layer 206, so that the DMA FIS write from the device control layer 208 terminates in the device switching layer 206. On receiving the FIS packet, the device switching layer 206 updates the host system memory location as specified in PxFB using the corresponding DMA engines 216, for example, the DMA engine 216-1 or 216-2, and also stores the FIS for future use.

At block 306, the SATA device 108 is initialized for the second host processor 104-2. When the second host processor 104-2 enables the controller by setting its AHCI registers, the previously stored Signature FIS is transmitted to its system memory and the status registers are updated to signify a successful initialization of the SATA device 108 for the second host processor, say host processor 104-2. The platform software also ensures that both the host processors 104 are allocated unique space on the SATA device 108, and no file system corruption issue occurs because each of the host system is allocated a separate partition.

After the completion of the initialization of the SATA device 108, either of the host processors 104 can issue commands to the SATA device 108. The command execution is further explained with reference to FIG. 4.

Referring to FIG. 4, at block 402, a first host processor 104-1 builds the command list in its host system memory 105-1 and sets the command issue register in the device switching layer 206. For example, the first host processor 104-1 sets the command issue register in the device switching layer 206. Additionally, the first host processor 104-1 may also update the PORT#_CI register in the device switching layer 206.

At block 404, the device switching layer 206 detects the new command being issued by the first host processor 104-1 and sets the BSY bit in the first host's task file data status register, or the Px.TF.STS register, to state that the SATA device 108 is busy in executing the command and no more commands can be issued to the SATA device 108.

At block 406, the DMA Engine 216-1 in the device switching layer 206 and corresponding to the first host processor 104-1 starts pre-fetching the command header and command table. This pre-fetch logic for each of the hosts works independently and responds to the command being issued from respective host. This helps in improving the overall system performance particularly when the SATA device 108 is busy executing command from the first host processor 104-1. In such a scenario, the DMA engine 216-2 in the device switching layer 206 pre-fetches the commands for the second host processor 104-2. As the commands can be issued as non-queued or queued, the multi-host SATA controller 102 has configurable logic to balance the load from each of the host to the SATA device 108. Every single command boundary, (from issue till completion) is a logical point for switching the SATA device 108 between the host processors 104. As a default mechanism for command interleaving, single commands from all the host processors 104 can be interleaved.

In one implementation, the device switching layer 206 also implements a priority table for each of the host processors 104 to give more command allocation for any particular host. The table is updated by a platform control processor (not shown in the figure) and is used to select the number of commands from individual host processor 104 to be interleaved before being issued to the SATA device 108. Such a configuration provides performance enhancement in systems with heterogeneous host processors 104, where a performance critical host processors 104 can be allocated more commands compared to power critical/low performance host processors 104. This is further explained in FIG. 5.

On completion of the command pre-fetch from the host system memory 105-1, the multi-host SATA controller 102 at block 408 performs a command parsing to determine whether a device reset or power management related commands are passed on to the SATA device 108, as these can impact the SATA device 108 response to the other host 104-2 which might be having pending data transfer commands. If power management command is issued, the multi-host SATA controller 102 updates the host device registers 214-1 and 214-2 at block 410 to reflect a successful completion of the command without affecting the SATA device 108. In case the reset command or host bus adapter reset is issued for any given host, the reset may be blocked by the device switching layer 206 in order to avoid any disruption of the ongoing commands from the other host to the SATA device 108. In order to comply with the software for reset request, the host specific registers are updated in accordance to the successful completion of the reset command.

However, if the command is a neither a reset nor a power management command, the command is qualified to be issued to the SATA device 108, and the multi-host SATA controller 102 enables all interrupts and issues the command to the device shadow registers 222 in the device control layer 208 at block 412.

In one implementation, the device switching layer 206 enables all the interrupts for the SATA device 108 by updating PxIE registers in the device control layer 208, thereby allowing the device switching layer 206 to keep a better track of the device control layer 208. This is also done in order to check for any issue with the SATA device 108 during the command execution. Whenever the interrupt is asserted by the device control layer 208, the device switching layer 206 reads the interrupts status (PxIS) register in the device shadow registers 222 to determine the nature of the interrupt. The device switching layer 206 then checks for the host interrupt enable (PxIE) register bit for the generated interrupt, to determine if the host processors 104 is required to be interrupted. In case the host processors 104 does not have the particular bit set in the PxIE register, the interrupt is consumed in internal state machine of the device switching layer 206 and is ignored for the host processor 104 without notifying the host processor 104. Thus the interrupt mechanism with respect to host processor 104 remains consistent as if the host processor 104 is the only controller of the SATA device 108 in the system 100.

In certain cases where the interrupt occurs due to some problem with the physical layer 212, the device switching layer 206 updates the registers for all the host processors 104 irrespective of which host processor 104 command is being executed. This can enable the other host processors 104 with pending commands to prepare for error recovery. When multiple host processors 104 try to perform an error recovery, based on error recovery request, one of the host processor 104 may be chosen as the primary host processor whose commands and controls are passed on to the SATA device 108, while all other host processors 104 requests are terminated in the device switching layer 206 itself. The register updates during the error recovery of the non primary host processor 104 are updated in the host specific registers in order to avoid any incompatibility. Particularly, in error recover of a host processor 104, connection link between the host processor and the SATA device may be disabled and current pending commands by the host processor 104 may be flushed for the SATA device. Further, a COMRESET signal may be sent to the SATA device to restart an associated OOB sequence.

Subsequently, the DMA engine 224 within the device control layer 208 starts fetching the commands. For example, the DMA engine 224 generates access to read the command FIS and PRDs (Physical Region descriptors), the memory locations for data transfers during command execution.

At block 414, the host DMA switch 221 in the device switching layer 206 routes the request to the host command buffer 218-1 of the first host processor 104-1 and the device control layer 208 passes the command to the SATA device 108. In one implementation, as the command is already available in the host command buffer 218-1 of the device switching layer 206, the Host DMA switch 221 routes all the command requests to the host command buffer 218-1 instead of the host system memory 105-1. After fetching the command from host command buffer 218-1, the device control layer 208 issues the command to the SATA device 108 and waits for the completion of the command.

At block 416, it is determined that the command involves a data transfer. If the command does not involve data transfer, the SATA device 108 sends the registerD2H FIS based on command completion. If the command involves a data transfer, the DMA engine 224 within the device control layer 208 performs the data transfer by transitioning to block 418.

At block 418, the request from the device control layer 208 is directly routed to the host system memory 105-1 to enable a low latency path.

At block 420, a D2H (Device to Host) FIS is received by the device control layer 208 to state the completion of the command. The D2H FIS is sent by the SATA device 108. Further, such an FIS is transmitted to the device switching layer 206 by the DMA engine 224 within the device control layer 208, where the results and status of the commands will be updated in host device registers 214-1. The device switching layer 206 clears the BSY bit from the host device register 214-1 on the successful completion of the command and to enable the host to issue further commands at block 422.

Additionally, after a fixed number of the commands (configured by device driver software) are completed for a given host processor 104, the device switching layer 206 updates the device shadow registers 222 in the device control layer 208 with the registers of the other host processor 104-2. This operation is repeated until there are no pending commands for either of the host processors 104.

FIG. 5 illustrates the execution of queued commands 500 in the system 100, according to an implementation of the present subject matter. As described in the block 406 of FIG. 4, the BSY bit is set when the first host processor 104-1 issues a command to the multi-host SATA controller 102 and is cleared on the completion of the command. During the period the BSY bit is set, the other host processor 104-2 is not allowed to issue commands to the SATA device 108.

In order to improve the system performance, the SATA device 108 implements internal command queue to accept more than one command and perform an out of order completion to minimize seek latency. This feature is termed as Native Command Queuing (NCQ). Thus, in order to enable the other host processor 104-2 to issue commands, the SATA device 108 sends details to the host register FIS as soon as the SATA device 108 receives the command. The host register FIS has the BSY bit cleared and thus the device switching layer 206 clears the BSY bit in the host registers at block 502.

At block 504, it is ascertained that an NCQ command has been issued. When an NCQ command is issued by the host processors 104, the DMA engines 216 of the device switching layer 206 pre-fetches and stores commands in the order in which they are issued by the host processors 104. As the NCQ commands are DMA read/write commands, each command involves transfers of data blocks as specified by the PRD's (Physical Region Descriptors) in the command table.

At block 506, the DMA engines 216 of the device switching layer 206 are configured to pre-fetch PRDs for all the outstanding NCQ commands being issued to the SATA device 108, and ensure that the PRD is available in local host command buffer whenever the SATA device 108 requests for the same. This improves the system performance as compared to PRDs being read from host system memories, as in conventional SATA controllers.

At block 508, the device control layer 208 reads the commands from the host command buffer 218 of the device switching layer 206. Accordingly, the device control layer 208 issues commands to the SATA device 108.

At block 510, it is determined whether or not a Set Device Bits FIS (SDBFIS) is received. As the SATA device 108 performs an out-of-order completion of the NCQ commands, the SATA device 108 updates the status with a Set Device Bits FIS (SDBFIS) to the multi-host SATA controller 102. The SDBFIS when received ("Yes" Branch at block 510) by the device control layer 208 is transmitted to the device switching layer 206 at block 512, where it is used to update the host device registers 214 to indicate successful command completion notification. The DMA engines 216 in the device switching layer 206 transmit the FIS to the host system memory 105-1. However, if it determined that the SDBFIS is not received ("No" Branch at block 510), the SATA device 108 detects the NCQ command and immediately sends register D2H FIS at block 514. Subsequently, the device control layer 208 receives the FIS At block 516, the DMA engine 224 issue write for FIS. The host DMA switch 221 routes the FIS to the host command buffer 218 in the device switching layer 206 at block 518 and at block 520, the device switching layer clears the BSY bit in the host device registers 214 to issue command.

Although the multi-host SATA controller 102 is explained with respect to multiple host processors, it will be appreciated by a person skilled in the art that in absence of multiple host processors and several system images, the multi-host SATA controller 102 may be used with a complete bypass of the device switching layer 206, by giving a direct I/O access to the host processors 104 requesting for the available SATA device 108. It will be understood that even though only a few sharing and switching methods are discussed, alternate procedures may also exist as can be perceived by person skilled in art Also, even though implementations of a multi-host SATA controller 102 have been described in language specific to structural features and/or methods, it is to be understood that the invention is not necessarily limited to the specific features or methods described. Rather, the specific features and methods are disclosed as exemplary implementations for the multi-host SATA controller 102.

We claim:

1. A method of simultaneous sharing of a SATA device in a multi-host computing system comprising:
    initializing the SATA device for a host processor from amongst a plurality of host processors of the multi-host computing system, wherein the SATA device is shared among the plurality of host processors;
    receiving a signature frame information structure (FIS) from the SATA device for the host processor, wherein the signature FIS is indicative of a status of the SATA device;
    providing the signature FIS to the host processor, wherein the signature FIS is stored in a memory of the host processor and a memory of a device switching layer of a multi-host SATA controller for sharing of the SATA device among the plurality of host processors;
    retrieving the signature FIS for the host processor stored in the memory of the device switching layer; and
    providing the signature FIS to at least one other host processor from amongst the plurality of host processors, wherein the signature FIS is stored in a host system memory of the at least one other host processor to initialize the SATA device with the at least one other host processor for sharing of the SATA device among the plurality of the host processors.

2. The method as claimed in claim 1, wherein the providing is based on a device type identified through the signature FIS.

3. The method as claimed in claim 1, wherein the plurality of host processors run on heterogeneous operating systems.

4. The method as claimed in claim 1, wherein the initializing comprises one or more of SATA device detection, staggered spin-up, link speed configuration, and waiting for SATA device ready signal.

5. The method as claimed in claim 1, wherein the method further comprises:
    parsing simultaneous requests from one or more host processors from amongst the plurality of host processors for the SATA device to identify command boundaries; and
    arbitrating between the requests from the one or more host processors based at least on the identified command boundaries.

6. The method as claimed in claim 5, wherein the arbitration is based on one or more of a pre-determined arbitration scheme, random selection, and load balancing.

7. The method as claimed in claim 5, wherein the parsing of requests is done in parallel to command execution by the SATA device for a host processor from amongst the plurality of host processors.

8. The method as claimed in claim 1, wherein the method further comprises:
    receiving a low power mode request from the host processor, amongst the plurality of host processors;
    identifying a power state of the SATA device corresponding to other host processors among the plurality of host processors, wherein the SATA device is shared simultaneously among the plurality of host processors;
    restricting a propagation of the low power mode request to the SATA device upon determining an active state of the SATA device corresponding to at least one host processor from amongst the other host processors; and
    sending a dummy completion signal to the host processor in response to the low power mode request, wherein the dummy completion status is indicative of a successful completion of the low power mode request.

9. The method as claimed in claim 8, wherein the method further comprises:
    sending the low power mode request to the SATA device upon determining low power state of the SATA device corresponding to all the other host processors; and
    forwarding a completion signal from the SATA device to the host processor in response to the low power mode request.

10. The method as claimed in claim 1, wherein the method further comprises:
    receiving an error recovery request from the SATA device for the host processor from amongst the plurality of host processors;
    identifying power state of the SATA device corresponding to other host processors among the plurality of host processors; wherein the SATA device is shared simultaneously among the plurality of host processors; and
    restricting the error recovery request to the host processors coupled to the SATA device in active mode upon determining the power state of the SATA device corresponding to the other host processors.

11. The method as claimed in claim 10, wherein error recovery comprises one or more of disabling connection link between the host processor and the SATA device, flushing current pending commands by the host processor and the SATA device, and sending a COMRESET to the SATA device to restart an associated OOB sequence.

12. A multi-host SATA controller (102) for sharing of a SATA device (108) among multiple host processors (104) in a multi-host computing system, wherein the multi-host SATA controller (102) comprises:
    a device switching layer (206) configured to:
        initialize the SATA device (108) for a host processor (104) from amongst a plurality of host processors (104) of the multi host computing system, wherein the SATA device (108) is shared among the plurality of the host processors (104);

receive a signature frame information structure (FIS) from the SATA device (108) for the host processor (104), wherein the signature FIS is indicative of the status of the SATA device (108);

provide the signature FIS to the host processor (104), wherein the signature FIS is stored in a memory of the host processor (104) and a memory of device switching layer (206) enabling sharing of the SATA device (108) among the plurality of the host processors (104);

retrieving the signature FIS for the host processor (104) stored in the memory of the device switching layer (206); and providing the signature FIS to at least one other host processor (104) from amongst the plurality of host processors (104), wherein the signature FIS is stored in a memory of the at least one other host processor (104) to initialize the SATA device (108) with the at least one other host processor (104) for enabling sharing of the SATA device (108) among the plurality of the host processors (104).

13. The multi-host SATA controller (102) as claimed in claim 12, the device switching layer (206) comprising a plurality of host device registers (214), each corresponding to a host processor (104) from amongst the plurality of host processors (104), wherein each of the host device register (214) is coupled to an I/O controller (106) of the respective host processor (104).

14. The multi-host SATA controller (102) as claimed in claim 12, the device switching layer (206) comprising a plurality Direct Memory Access (DMA) Engines (216), each corresponding to a host processor (104) from amongst the plurality of host processors (104) and a host device register (214), wherein the each of the DMA engine (216) is coupled to an I/O controller (106), and wherein the DMA engine (216) accesses a host memory system (105) of the associated host processor (104).

15. The multi-host SATA controller (102) as claimed in claim 12, the device switching layer (206) comprising a command switch engine (220) configured to:

parse simultaneous requests from one or more host processors (104) from amongst the plurality of host processors (104) for the SATA device (108) to identify command boundaries; and arbitrate between the requests from the one or more host processors (104) based at least on the identified command boundaries.

16. The multi-host SATA controller (102) as claimed in claim 15, the device switching layer (206) further comprising a host DMA switch (221) configured to receive the arbitrated requests and pre-fetching logic.

17. The multi-host SATA controller (102) as claimed in claim 15, further comprising a device control layer (208) comprising:

device shadow registers (222) configured to receive configuration parameters for the arbitrated request for the SATA device (108) through a command switch engine (220) of the device switching layer (206), wherein the request is arbitrated from a plurality of requests originating from the plurality of host processors (104); and a DMA engine (224) configured to receive the arbitrated request, through the host DMA switch (221), wherein the DMA engine (224) provides the received arbitrated request to the SATA device (108).

18. The multi-host SATA controller (102) as claimed in claim 12, wherein the plurality of host processors (104) are running on heterogeneous operating systems.

19. The multi-host SATA controller (102) as claimed in claim 13, wherein the host device registers (214) comprise one or more of Advance Host Controller Interface (AHCI) control registers, AHCI status registers, and configuration registers.

20. The multi-host SATA controller (102) as claimed in claim 12, wherein the device switching layer (206) is further configured to route asynchronous notifications occurring at the SATA device (108) to each of the plurality of host processors.

* * * * *